US009306943B1

(12) United States Patent
Bailey et al.

(10) Patent No.: US 9,306,943 B1
(45) Date of Patent: Apr. 5, 2016

(54) ACCESS POINT—AUTHENTICATION SERVER COMBINATION

(71) Applicant: EMC Corporation, Hopkinton, MA (US)

(72) Inventors: Daniel V. Bailey, Pepperell, MA (US); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 115 days.

(21) Appl. No.: 13/853,653

(22) Filed: Mar. 29, 2013

(51) Int. Cl.
*H04L 9/32* (2006.01)
*H04L 29/06* (2006.01)
*H04W 12/06* (2009.01)

(52) U.S. Cl.
CPC ............ *H04L 63/0853* (2013.01); *H04L 63/02* (2013.01); *H04W 12/06* (2013.01)

(58) Field of Classification Search
CPC . H04L 12/2803; H04L 12/2818; H04L 63/02; H04L 63/10; H04L 63/029; H04L 63/0853; H04L 63/0209; H04L 63/08; H04L 63/0838; H04W 88/08
See application file for complete search history.

(56) References Cited

U.S. PATENT DOCUMENTS

| | | | |
|---|---|---|---|
| 6,976,165 B1 | 12/2005 | Carpentier et al. | |
| 7,334,126 B1 * | 2/2008 | Gilmore .............. | H04L 63/0281 707/999.001 |
| 7,480,500 B1 * | 1/2009 | Mittal ............................ | 455/403 |
| 7,542,468 B1 * | 6/2009 | Begley et al. ................. | 370/389 |
| 7,634,630 B1 | 12/2009 | Van Riel et al. | |
| 7,730,518 B2 | 6/2010 | Jakobsson et al. | |
| 7,734,886 B1 | 6/2010 | Van Riel et al. | |
| 7,739,728 B1 * | 6/2010 | Koehler et al. ................. | 726/11 |
| 7,792,924 B2 * | 9/2010 | Liu ........................ | H04L 67/025 709/206 |
| 7,810,147 B2 | 10/2010 | Duane et al. | |
| 7,849,323 B2 | 12/2010 | Field et al. | |
| 7,904,557 B1 | 3/2011 | Van Riel et al. | |
| 7,920,050 B2 | 4/2011 | Juels et al. | |
| 8,060,750 B2 * | 11/2011 | Duane et al. ................... | 713/182 |
| 8,060,922 B2 | 11/2011 | Chrichton et al. | |
| 8,166,524 B2 * | 4/2012 | Sentinelli ................ | G06F 21/34 340/5.1 |
| 8,261,066 B2 | 9/2012 | Carpentier et al. | |
| 8,302,167 B2 * | 10/2012 | Mennes et al. ..................... | 726/5 |
| 8,346,926 B1 | 1/2013 | Van Riel et al. | |
| 8,386,783 B2 * | 2/2013 | Tanaka .................. | H04L 63/029 713/171 |

(Continued)

FOREIGN PATENT DOCUMENTS

WO    WO 2013/041882    *    3/2013    .............. H04L 29/06

*Primary Examiner* — Taghi Arani
*Assistant Examiner* — Sharon Lynch
(74) *Attorney, Agent, or Firm* — BainwoodHuang

(57) ABSTRACT

A technique controls access to a protected resource. The technique involves providing a tokencode prompt to a user. The tokencode prompt requests a tokencode from an electronic token in possession of the user. The technique further involves receiving, in response to the tokencode prompt, a current tokencode from the electronic token in possession of the user. The technique further involves performing, by a SOHO device having an embedded tokencode authentication server, an authentication operation based on the current tokencode. A result of the authentication operation (i) permits the user to access the protected resource when the authentication operation determines that the user is legitimate and (ii) denies the user access to the protected resource when the authentication operation determines that the user is not legitimate. For example, the SOHO device may be a NAS device or a firewall device which with tokencode authentication capabilities.

15 Claims, 6 Drawing Sheets

(56) References Cited

U.S. PATENT DOCUMENTS

| | | | |
|---|---|---|---|
| 8,438,617 B2 | 5/2013 | Brainard et al. | |
| 8,590,030 B1* | 11/2013 | Pei | 726/9 |
| 8,812,860 B1* | 8/2014 | Bray | 713/182 |
| 8,839,408 B1* | 9/2014 | McKinnon et al. | 726/14 |
| 2002/0103850 A1* | 8/2002 | Moyer et al. | 709/202 |
| 2002/0103898 A1* | 8/2002 | Moyer et al. | 709/224 |
| 2004/0067736 A1* | 4/2004 | Kamma | H04W 12/06 455/41.2 |
| 2005/0059396 A1* | 3/2005 | Chuah et al. | 455/435.1 |
| 2005/0114520 A1* | 5/2005 | White et al. | 709/228 |
| 2005/0138186 A1* | 6/2005 | Hesselink et al. | 709/229 |
| 2005/0144200 A1* | 6/2005 | Hesselink et al. | 707/204 |
| 2005/0149481 A1* | 7/2005 | Hesselink et al. | 707/1 |
| 2005/0190769 A1* | 9/2005 | Smith | H04L 12/66 370/395.2 |
| 2006/0126645 A1* | 6/2006 | Devarapalli et al. | 370/401 |
| 2006/0197973 A1* | 9/2006 | Castellani | G06K 15/00 358/1.14 |
| 2007/0101421 A1* | 5/2007 | Wesinger et al. | 726/11 |
| 2007/0174614 A1* | 7/2007 | Duane et al. | 713/168 |
| 2007/0234064 A1* | 10/2007 | Nihei | 713/183 |
| 2009/0052675 A1* | 2/2009 | Levow | G06F 21/33 380/278 |
| 2009/0165096 A1* | 6/2009 | Hughes et al. | 726/5 |
| 2009/0254671 A1* | 10/2009 | Richard | H04L 12/2836 709/230 |
| 2010/0098061 A1* | 4/2010 | Doherty et al. | 370/352 |
| 2010/0138652 A1* | 6/2010 | Sela et al. | 713/158 |
| 2011/0264815 A1* | 10/2011 | Fascenda | 709/229 |
| 2011/0321148 A1* | 12/2011 | Gluck | 726/9 |
| 2012/0054296 A1* | 3/2012 | Chaudhry et al. | 709/213 |
| 2012/0221859 A1* | 8/2012 | Marien | 713/172 |
| 2012/0227109 A1* | 9/2012 | Dimuro | 726/24 |
| 2012/0284786 A1* | 11/2012 | Somani et al. | 726/7 |
| 2013/0089205 A1* | 4/2013 | Pai | 380/278 |
| 2013/0170471 A1* | 7/2013 | Nix | 370/331 |
| 2013/0173811 A1* | 7/2013 | Ha | H04W 76/02 709/227 |
| 2013/0219457 A1* | 8/2013 | Touboul | 726/1 |
| 2013/0262929 A1* | 10/2013 | Oelsner | H04L 41/0226 714/27 |
| 2013/0263211 A1* | 10/2013 | Neuman et al. | 726/1 |
| 2014/0115677 A1* | 4/2014 | Popp | 726/6 |
| 2014/0173284 A1* | 6/2014 | Ganesan | 713/171 |
| 2014/0222461 A1* | 8/2014 | Tolcher et al. | 705/3 |
| 2014/0331311 A1* | 11/2014 | Zuk et al. | 726/13 |
| 2015/0058916 A1* | 2/2015 | Rostami-Hesarsorkh et al. | 726/1 |

\* cited by examiner

ACCESS POINT—AUTHENTICATION SERVER COMBINATION

BACKGROUND

In conventional home office settings, users typically rely on passwords to impose security over home electronics such as personal computers, network attached storage (NAS) boxes, and routers. That is, when a user wishes to access such a device, the user provides a user identifier (or name) and a password. If the user-provided password matches an expected password for that user identifier, the home electronics device provides the user with access. Otherwise, the device denies access.

In conventional large enterprise settings, users may rely on authentication tokens to impose security over critical assets such as online bank accounts, corporate virtual private networks (VPNs), hospital records, and so on. The authentication tokens (e.g., a dedicated hardware device, a specialized software application installed on a smart phone, etc.) are configured to output different one-time use passcodes (OTPs) over time (e.g., a different OTP every minute). When a user wishes to access a critical asset, the user provides a user identifier and a current OTP from the authentication token issued to that user (perhaps with additional authenticating information such as a personal identification number or PIN, answers to knowledge-based authentication questions, biometric data, etc.). If the current OTP matches an expected OTP (and if other non-time-sensitive information matches as well), the user is granted access to the critical asset. Otherwise, the user is denied access.

SUMMARY

Unfortunately, there are deficiencies to the above-described conventional approaches to providing security. In particular, the conventional home office setting approach relies on passwords which are known to be problematic. For example, users often pick bad passwords which are easily guessable. Additionally, users routinely forget passwords, or store passwords in written form in conveniently accessible but insecure locations in case they forget them. Moreover, in contrast to OTPs, passwords are static meaning that once they fall into the hands of malicious people, the security that the passwords provide is permanently defeated. Such password deficiencies are particularly prevalent in home office, small office, and small organization environments in which an alternative such as use of dedicated access control equipment such as a dedicated authentication server is too expensive and/or complex.

Additionally, the above-described conventional large enterprise approach which uses OTP authentication has a high implementation burden/cost thus making it impractical for a home setting. Along these lines, the conventional large enterprise approach typically relies on large-scale authentication token distribution, dedicated authentication server equipment to perform authentication operations, and a trained/professional IT support staff. Even though the provisioning and maintenance costs associated with OTP authentication are high, large enterprises are willing to invest in this infrastructure with the understanding that, over time, the higher security offered by OTP authentication will save the enterprises money and time.

In contrast to the above-described conventional approaches, improved techniques are directed to controlling access to computerized resources using a tokencode authentication server embedded within a point of access, i.e., utilization of a device that is an access point-authentication server combination. Such a device is able to control access to internal resources as well as access to other resources that the device can communicate with. In one example, a networked device which is specialized to operate as network attached storage (NAS) also operates as a tokencode authentication server. In another example, a networked device which is specialized to operate as a firewall also operates as a tokencode authentication server. Such techniques eliminate the need for dedicated authentication server devices and are well suited for small office/home office (SOHO) environments.

One embodiment is directed to a method of controlling access to a protected resource. The method includes providing a tokencode prompt to a user. The tokencode prompt requests a tokencode from an electronic token in possession of the user. The method further includes receiving a current tokencode from the electronic token in possession of the user. The method further includes performing, by a SOHO device having an embedded tokencode authentication server, an authentication operation based on the current tokencode. A result of the authentication operation (e.g., an access control signal) (i) permits the user to access the protected resource when the authentication operation determines that the user is legitimate and (ii) denies the user access to the protected resource when the authentication operation determines that the user is not legitimate.

In some arrangements, the SOHO device is a NAS unit having (i) a set of storage drives and (ii) a controller which performs data storage operations to store data into and load data from the set of storage drives. In these arrangements, the protected resource is the data (e.g., files, a home-based website, etc.). Here, performing the authentication operation includes locally comparing, by the controller of the NAS unit, the current tokencode to an expected tokencode to determine whether the user is legitimate. In particular arrangements, the method further includes storing personal data of the user on the set of storage drives of the NAS unit, the controller of the NAS unit working to secure the personal data by performance of tokencode authentication operations.

In some arrangements, the SOHO device is a network firewall unit having (i) network ports and (ii) a controller which performs network firewall operations to control network traffic between the network ports. In these arrangements, performing the authentication operation includes locally comparing, by the controller of the network firewall unit, the current tokencode to an expected tokencode to determine whether the user is legitimate.

In some firewall arrangements, the network firewall unit includes, as the network ports, (i) a public network port which connects to a public computer network and (ii) a private network port which connects to a private computer network. In these arrangements, the method further includes providing a user device on the public computer network with access to an access point device on the private network when the current tokencode matches the expected tokencode. The method further includes preventing the user device on the public computer network from accessing the access point device on the private network when the current tokencode does not match the expected tokencode.

In some arrangements, the access point device on the private network includes, as the protected resource, a data storage apparatus (e.g., NAS). In these arrangements, providing the user device with access to the access point device includes conveying communications signals between user device and the data storage apparatus through the network firewall unit to enable the user device to access data on the data storage apparatus (e.g., to allow the user device to access files from the Internet).

In some arrangements, the access point device on the private network includes, as the protected resource, a home appliance. In these arrangements, providing the user device with access to the access point device includes conveying communications signals between user device and the home appliance to enable the user device to control operation of the home appliance (e.g., a garage door opener, an electronic front door, a home security system, a thermostat, a network camera, etc.).

In some arrangements, providing the user device with access to the access point device includes, in response to performance of an initialization operation (e.g., a startup routine in which the SOHO device is dynamically assigned an address), registering a current network address of the network firewall unit with a dynamic domain name system (DDNS) service. Such an arrangement enables the user device to communicate with the network firewall unit using a device name which the DDNS service resolves into the current network address.

In some arrangements, the network firewall unit is capable of performing deep packet inspection. In these arrangements, the firewall is capable of monitor all HTTP traffic flowing through the firewall to some HTTP site inside the private network. One example is a connection from outside the firewall to a web server inside the firewall. Another example is a connection from outside the firewall to a web-based administration port on a device such as a NAS box or a router. In such arrangements, the firewall inspects packets flowing through the firewall looking for some authentication —for example a password authentication. If the firewall detects such a session flowing through itself, the firewall intercepts the authentication request, and substitutes a prompt to the remote user for a proper user identifier and tokencode. When firewall receives the token code, the firewall intercepts that message and then sends the user identifier and tokencode to the authentication services embedded in the SOHO environment (e.g., a wireless access point, a NAS box, etc.). If authentication is successful, then the firewall inserts an authentication response which is acceptable to the web server which was originally asking for the user authentication. This response might be a static password, or some other prearranged response which will be acceptable to the web server. The advantage of these arrangements is that the firewall is essentially injecting a token code authentication into any web session, even if the web site has no knowledge of token codes or the authentication service. This improves the security of all web sites in the SOHO environment with no specialized changes to these sites to support token code prompting and authentication.

In some arrangements, access to devices on a public network can be controlled using the improved techniques. In these arrangements, the network firewall unit includes, as the network ports, (i) a public network port which connects to a public computer network and (ii) a private network port which connects to a private computer network. In these arrangements, the method further includes providing a user device with access to an access point device on the public network (e.g., a webcam connected to the Internet) when the current tokencode matches the expected tokencode, and preventing the user device from accessing the access point device on the public network when the current tokencode does not match the expected tokencode. In such arrangements, the user device may be on either the private computer network or the public computer network. Additionally, the embedded authentication server may reside on any SOHO device in the private computer network as long as the firewall allows tokencode validation requests and responses to pass through.

In some arrangements, the method further includes sending, by the SOHO device, a communication to the electronic token in possession of the user to authenticate the SOHO device to the electronic token. If authentication of the SOHO device by the electronic token is unsuccessful, the electronic token does not output a tokencode. Such arrangements are well suited for consumers that demand higher security in their communications.

In some arrangements, the authentication token is a challenge-response token in which the challenge-response token does not display a new tokencode every minute or simply in response to pressing of a button. Rather, the authentication service sends, as a challenge, a randomly generated number to the user. The user enters this random number into the challenge-response token to obtain a response tokencode (e.g., on a display). The user then provides the response tokencode back to the authentication service to be validated.

In some arrangements, the SOHO device includes a database containing a set of token seeds from which expected one-time use passcodes (OTPs) are derived. In these arrangements, the method further includes providing, by the SOHO device, a token seed from the database to the electronic token in possession of the user to configure the electronic token to provide, as tokencodes, OTPs locally derived from the token seed for comparison with the expected OTPs during authentication.

In some arrangements, the method further includes managing the set of token seeds within the database to accommodate multiple registered users. Along these lines, each authentication token has a unique seed so that the sequence of tokencodes is different for each authentication token. Accordingly, using their respective authentication tokens, the various users may be able to share access to multiple access point devices using OTP authentication from the SOHO device. For example, user access to access point devices (e.g., a NAS unit, a game console, a home thermostat, and so on) can be controlled by the SOHO device.

Other embodiments are directed to electronic systems and apparatus, processing circuits, computer program products, and so on. Some embodiments are directed to various methods, electronic components and circuitry which are involved in controlling access to a protected resource.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling access to computerized resources using a tokencode authentication server embedded within a point of access, i.e., a device that is an access point-authentication server combination. In addition to performing specialized primary operations (e.g., due to specialized/enhanced hardware), the access point device is able to control access to internal resources as well as external resources. In one example, a networked device which is specialized to operate as network attached storage (NAS) also operates as a tokencode authentication server. In another example, a networked device which is specialized to operate as a firewall also operates as a tokencode authentication server. Such a technique eliminates the need for a separate authentication server device and is well suited for a small office/home office (SOHO) environment.

Figure 1:
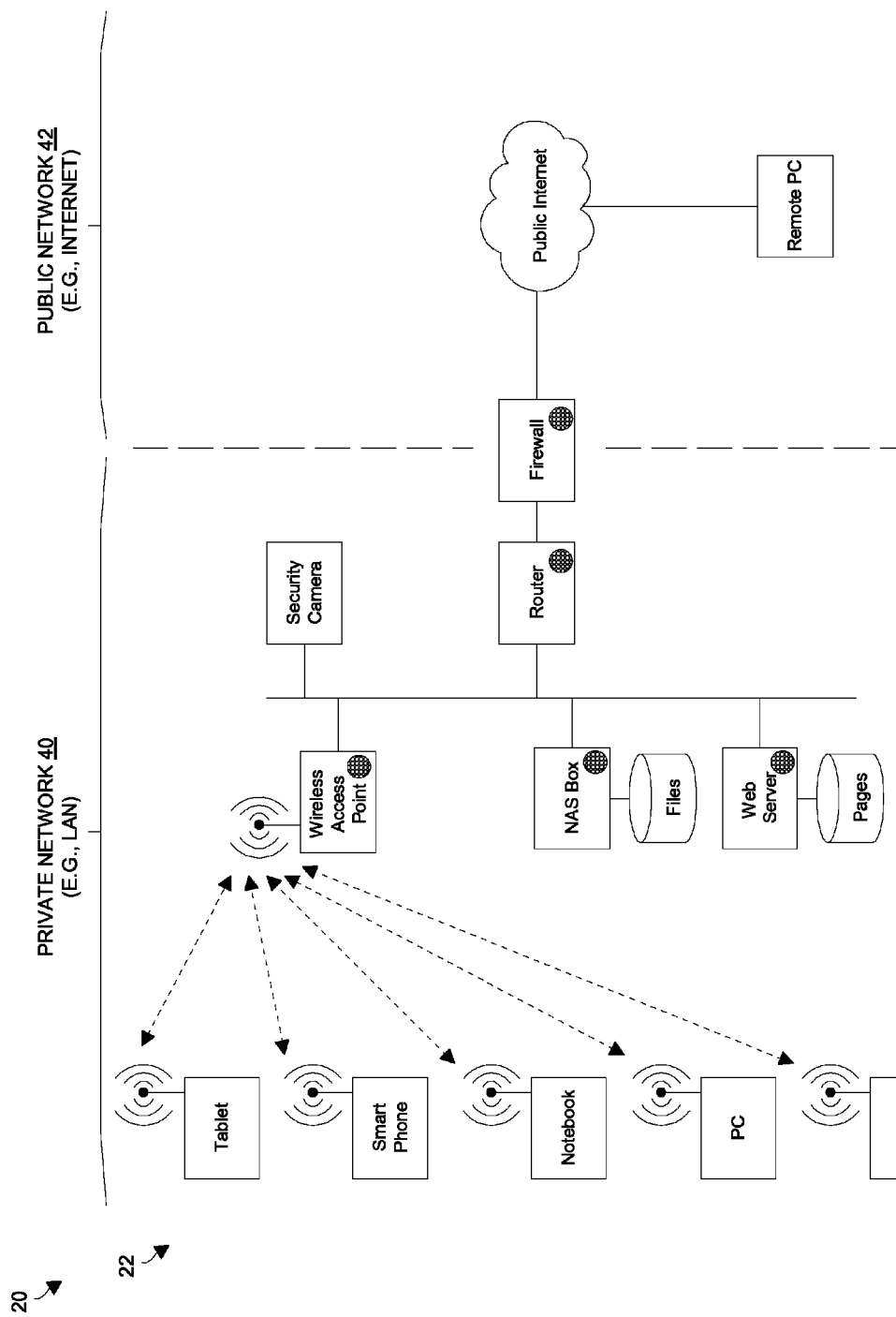
FIG. 1 is a block diagram of an electronic environment which includes an access point having tokencode authentication capabilities.

FIG. 1 shows an example SOHO environment 20 which protects one or more resources using tokencode authentication. The example SOHO environment 20 includes a variety of networked SOHO devices 22 which are capable of electronically communicating with each other. Along these lines, the SOHO devices 22 include a tablet, a smart phone, a notebook, a PC, a printer, and a wireless access point which are capable of carrying out wireless communications (see dashed lines). The SOHO devices 22 further include a network attached storage (NAS) box, a web server, a security camera, a router, and a firewall which, along with the wireless access point, are capable of carrying out wired communications (see solid lines).

It should be understood that the SOHO environment 20 may include other SOHO devices 22 as well. Examples of other SOHO devices 22 include a game console, a home security system, a copy machine, garage door openers, thermostats, home appliances, and so on.

As shown in FIG. 1, the wireless access point and the router form a private network 40. Although a single wireless access point is shown in the example SOHO environment 20, the environment 20 may include multiple wireless access points. Similarly, a single router is shown, but the environment 20 may include multiple network routers, network switches, etc. The firewall separates the private network 40 from a public network 42 (e.g., the Internet).

During operation, one or more users utilize the various SOHO devices 22 to perform useful work. In particular each SOHO device 22 performs a primary operation (e.g., network attached storage, printing, routing, etc.).

Additionally, a particular one of the SOHO devices 22 includes an embedded tokencode authentication server to perform tokencode authentication and thus provide stronger protection for one or more resources of the SOHO environment 20. The shaded circle shows suitable locations for deployment of the embedded tokencode authentication server, and other locations may be suitable as well.

It should be understood that, in contrast to larger enterprise-scale equipment, the SOHO devices 22, have smaller form factors (e.g., a single self-contained enclosure) and demand less support (e.g., less space, less cooling, less power, etc.) making these devices 22 more appropriate for a home or small office setting (e.g., less than 25 users, less than 10 users, etc.). Moreover, in contrast to enterprise-scale equipment which may be relatively loud and require a special operating environment (e.g., humidity control, temperature control, etc.), the SOHO devices 22 are appropriate for installation/operation within the same workspace occupied by users (e.g., low noise, less disruption to external air flow, etc.). Accordingly, other similarly provisioned apparatus are suitable for use as well.

With this in mind, it should be understood that some devices 22 may not be appropriate for the embedded tokencode authentication server unless those devices 22 are augmented with enough memory and processing power to support tokencode authentication server operation. For example, certain thinly provisioned home appliances such security cameras, thermostats and garage door openers may not have enough computerized resources, at least initially, to perform their primary operations as well as provide tokencode authentication services. Further details will now be provided with reference to FIG. 2.

Figure 2:
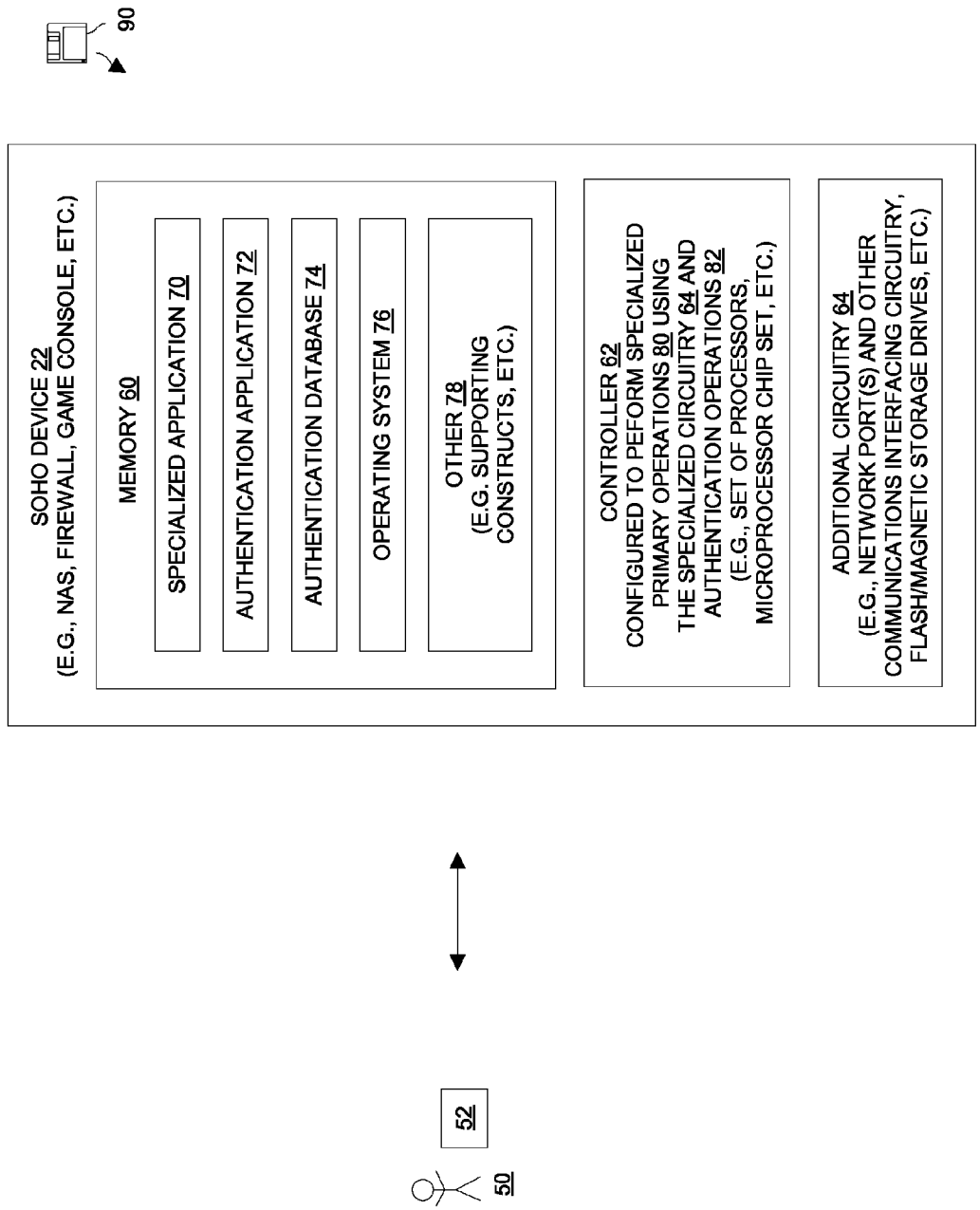
FIG. 2 is a block diagram of the access point of FIG. 1.

FIG. 2 is a block diagram of a particular SOHO device 22 having an embedded tokencode authentication server. The particular SOHO device 22 is constructed and arranged to perform specialized primary operations as well as tokencode authentication on users 50 in possession of respective authentication tokens 52. The particular SOHO device 22 includes memory 60, a controller 62, and additional circuitry 64.

The memory 60 stores a specialized application 70, an authentication application 72, an authentication database 74, an operating system 76, and other memory constructs 78. The memory 60 is intended to represent both volatile storage (e.g., DRAM, SRAM, etc.) and non-volatile storage (e.g., flash memory, magnetic disk drives, etc.).

The controller 62 is coupled to the memory 60, and runs the various memory constructs stored in the memory 60 including the operating system 76, the specialized application 70 and the authentication application 72. In particular, the controller 62 runs the operating system 76 to manage and share computerized resources of the SOHO device 22 including memory space and processor cycles. The controller 62 runs the specialized application 70 to perform specialized primary operations 80 using the additional circuitry 64 (e.g., network attached storage operations for a NAS box, packet filtering operations for a firewall, etc.). Furthermore, the controller 62 runs the authentication application 72 to form an embedded tokencode authentication server which performs tokencode authentication operations 82.

It should be understood that the controller 62 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the SOHO device 22. The computer program product 90 has a non-transitory (or non-volatile) computer readable medium which stores a set of instructions which controls one or more operations of the SOHO device 22. Examples of suitable computer readable storage media include tangible articles of manufacture and apparatus which store instructions in a non-volatile manner such as CD-ROM, flash memory, disk memory, tape memory, and the like.

The additional circuitry 64 supports the specialized operations 80 of the SOHO device 22. Along these lines the additional circuitry 64 may include a network interface to enable the SOHO device 22 to communicate with the other components of the electronic environment 20, e.g., IP-based, SANbased, WiFi, cellular, Bluetooth, combinations thereof, and so on. The additional circuitry 64 may include augmented or enhanced storage, e.g., a high speed cache, significant non-volatile storage capacity, etc. The additional circuitry 64 may include specialized hardware, e.g., sensors, graphics processors, etc.

In the context of a NAS box, the additional circuitry 64 can include a large amount of non-volatile storage (e.g., flash and/or magnetic drives) and cache memory to temporarily hold user information (e.g., personal data). In the context of a network firewall, the additional circuitry 64 can include multiple network ports such as a trusted-side network port that connects to a private network and a non-trusted-side network port that connects to a public network (also see FIG. 1), as well as cache memory to temporarily buffer network traffic. In the context of a game console, the additional circuitry 64 includes advanced graphics circuitry, wireless communications circuitry to communicate with wireless game controllers, and so on.

During operation, the controller 62 runs the specialized application 70 to perform the specialized primary operations 80 (e.g., data storage operations, firewall operations, gaming operations, etc.). Additionally, the controller 62 runs the authentication application 72 to perform tokencode authentication services 82. In particular, the controller 62, which runs the authentication application 72 is able to (i) detect attempts (e.g., file access requests, login attempts, etc.) to access protected resources, (ii) perform user authentication by comparing user-supplied tokencodes with expected tokencodes derived from database entries in the authentication database 74, and (iii) ultimately grant access to one or more protected resources upon successful user authentication.

It should be understood that each user 50 possesses a respective authentication token 52 which is provisioned with a token seed to provide valid tokencodes for tokencode authentication (also see FIG. 2). The embedded authentication server of the particular SOHO device 22 has a copy of the token seed for each user 50 thus enabling the SOHO device 22 to derive the same tokencodes and thus determine whether that user 50 possesses the respective authentication token 50 (see the authentication database 74 in FIG. 2).

Examples of suitable authentication tokens 52 include hardware tokens (i.e., specialized pocket-sized devices) which output one-time use passcodes (OTPs). An RSA SecureID Hardware Authenticator, which is provided by EMC Corporation of Hopkinton, Mass., is an example of such a hardware token.

Examples of suitable authentication tokens 52 further include soft tokens which output OTPs. An RSA SecurID Software Authenticator running on a computerized device is an example of such a soft token mechanism.

Figure 3:
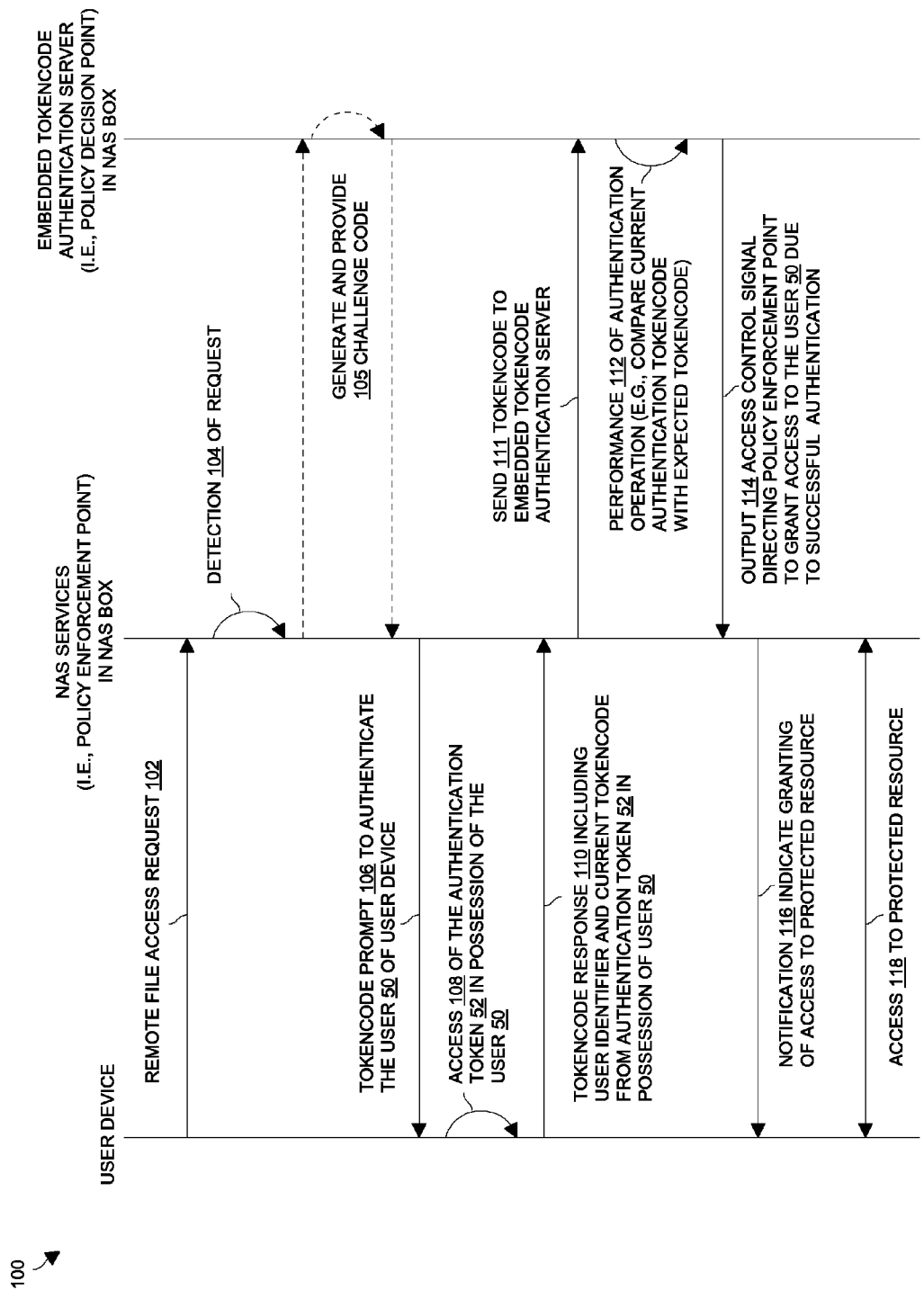
FIG. 3 is a sequence diagram illustrating particular operations occurring within the electronic environment of FIG. 1 in accordance with a first example.
Figure 4:
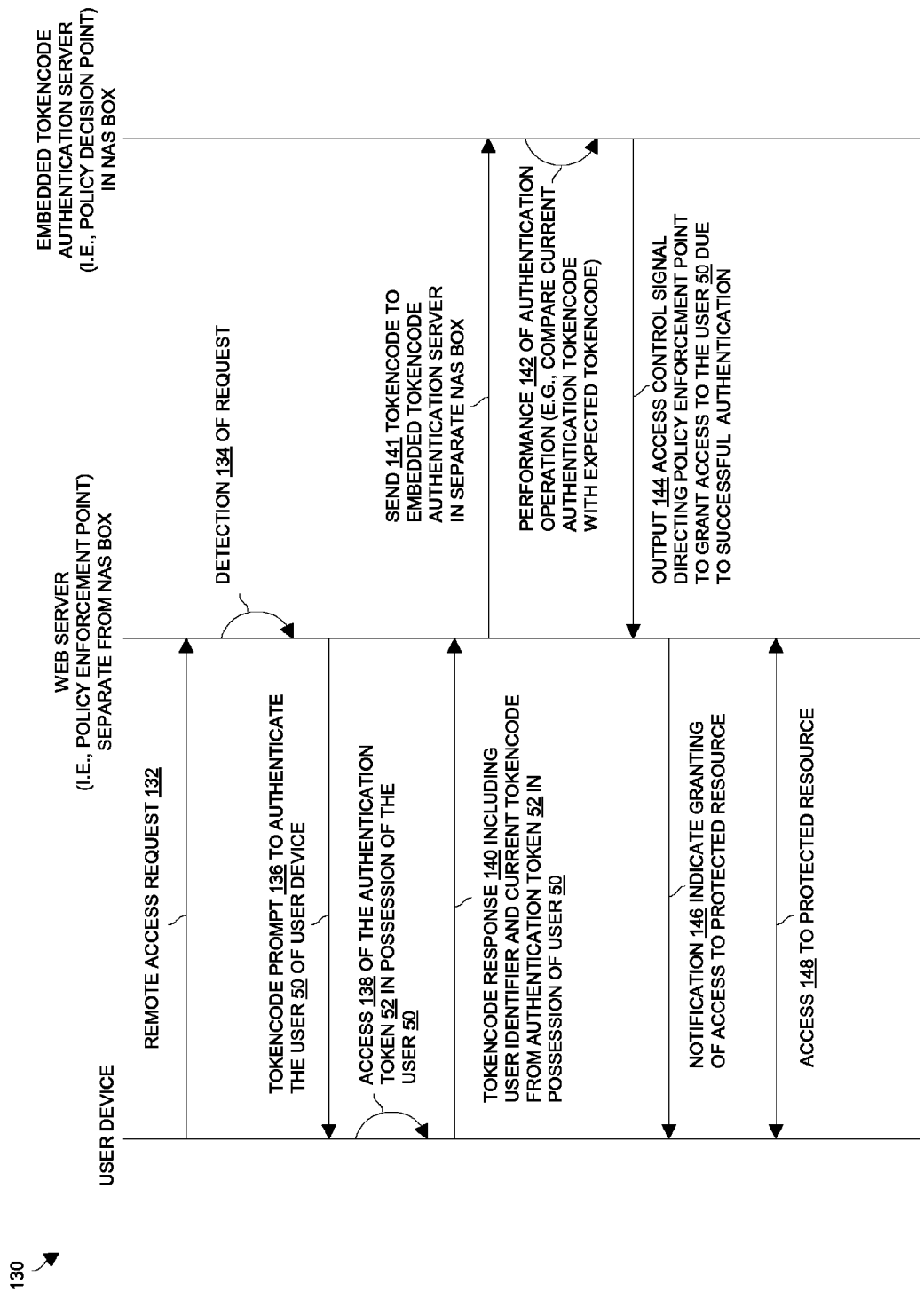
FIG. 4 is another sequence diagram illustrating particular operations occurring within the electronic environment of FIG. 1 in accordance with a second example.
Figure 5:
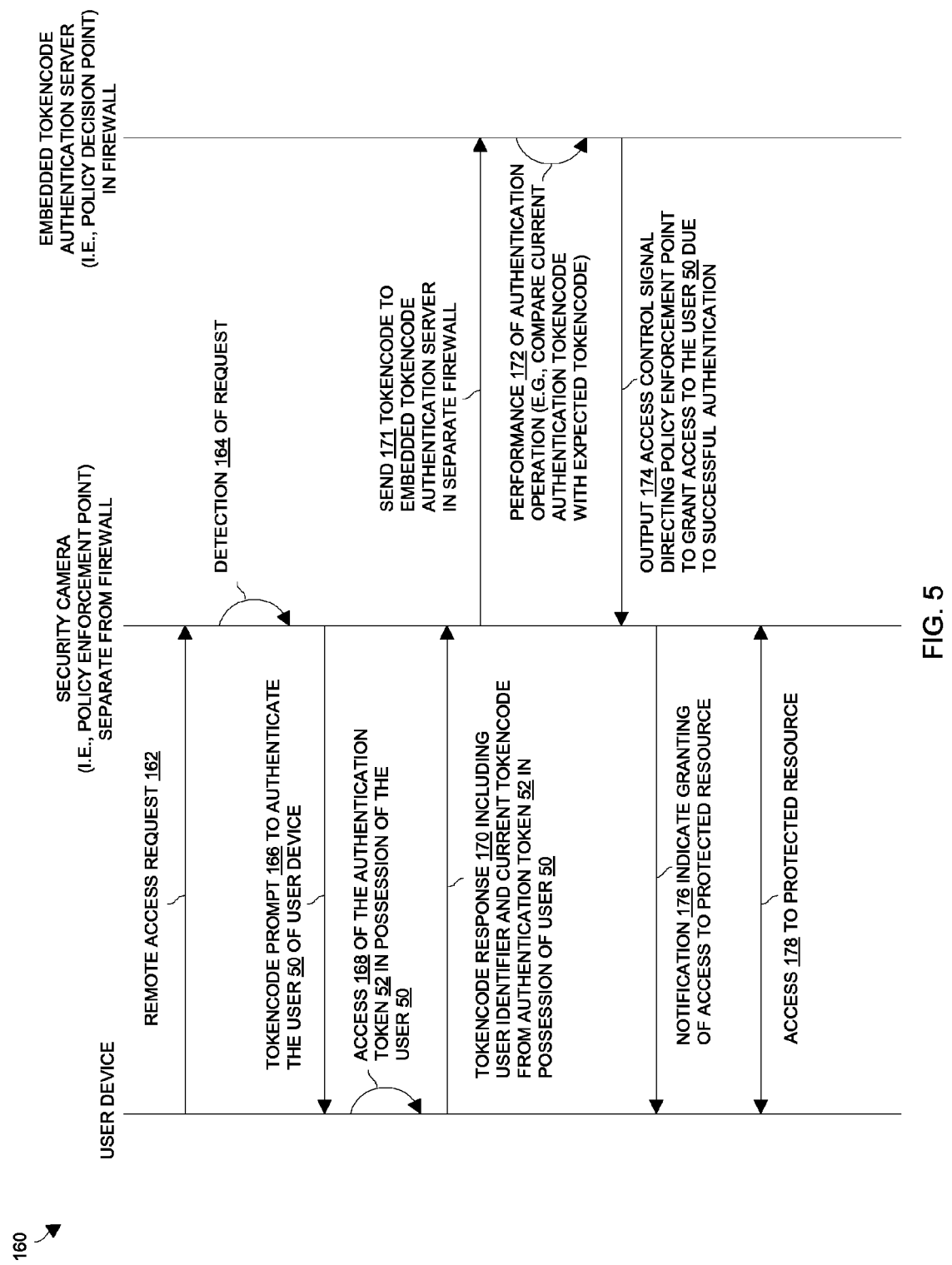
FIG. 5 is yet another sequence diagram illustrating particular operations occurring within the electronic environment of FIG. 1 in accordance with a third example.

Further details will now be provided via a set of examples and with reference to and FIGS. 3-5. FIGS. 3-5 are sequence diagrams illustrating particular access control configurations in which a policy decision point controls a policy enforcement point. FIGS. 3-5 are intended to be referenced in combination with the example SOHO environment 20 shown in FIG. 1.

As mentioned earlier, a particular SOHO device 22 is configured to operate as both specialized equipment to perform specialized primary operations 80 as well as a tokencode authentication server providing tokencode authentication services 82. Accordingly, it should be understood that each legitimate user 50 possesses a respective authentication token 52 which is properly provisioned to output current tokencodes for successful authentication with the particular SOHO device 22.

In some arrangements, if a user 50 loses or misplaces an authentication token 52, an administrator of the embedded tokencode authentication server (i.e., someone with special privileges) can generate a series of temporary passcodes or passwords to allow that user 50 to authenticate until the user 50 finds the authentication token 52 or obtains a new authentication token 52.

In some arrangements, the authentication tokens 52 are provisioned with token seeds from the authentication database 74 (FIG. 2) prior to deployment of the authentication tokens 52 for use. For example, the manufacturer can offer computer readable media such as a CD-ROM or flash drive which stores the authentication application and a set of hardware tokens pre-configured with token seeds by the manufacturer.

In other arrangements, users 50 are able to provision soft token capable devices (e.g., smart phones, tablets, laptops, etc.) with token seeds themselves. In certain arrangements, such provisioning is performed safely within the protection of the private network 40.

Example 1

Suppose that the NAS box of FIG. 1 includes an embedded tokencode authentication server to authenticate users 50 (FIG. 2). Accordingly, the NAS box performs NAS operations (e.g., storing and loading files), as well as provides tokencode authentication services.

Further suppose that a user 50 at one of the user devices of FIG. 1 (e.g., the tablet, the smart phone, the notebook, or PC) wishes to access a protected file on the NAS box. Recall that the user 50 must possess an authentication token 52 (FIG. 2) to obtain proper tokencodes for successful authentication.

To illustrate this situation, FIG. 3 shows a sequence diagram 100 which includes the user device, the embedded tokencode authentication server of the NAS box (i.e., a policy decision point), and the NAS services component of the NAS box (i.e., a policy enforcement point).

In order to obtain access to the protected file on the NAS box (i.e., the protected resource in this example), the user 50 sends a remote file access request from the user device to the NAS box (arrow 102 in FIG. 3). The remote file access request may be in the simple form of a command to open, read or copy a particular file. Alternatively, the remote file access request may be in a more elaborate form of a login request.

In turn, the NAS services component in the NAS box detects the remote file access request (arrow 104 in FIG. 3) and returns a tokencode prompt which requests a user identifier and a current tokencode from the user 50 (arrow 106 in FIG. 3). The tokencode prompt may be presented to the user 50 in the form of fillable cells or fields in the particular application (e.g., a GUI) that user 50 is using in an attempt to access the protected file. Alternatively, the tokencode prompt may be in the form of a web page, or the like, i.e., the specialized application 70 (FIG. 2) directs the controller 62 to operate as a web-based server.

In some arrangements, in which the authentication token 52 is a challenge-response token, the policy enforcement point (i) obtains a challenge code from the authentication service, and (ii) includes the challenge code in the tokencode prompt. This activity is illustrated by the dashed arrows 105 in FIG. 3.

Next, the user 50 obtains a tokencode from the authentication token 52 in the user's possession (arrow 108 in FIG. 3), and sends the tokencode from the user device to the NAS box (arrow 110 in FIG. 3). In some arrangements, the user manually reads the tokencode from a display of the authentication token 52, types a user identifier and the tokencode into the user device, and hits a submit button to send the user identifier and the tokencode to the NAS box. It should be understood that the user may need to press a button on the authentication token 52 to obtain a valid one-time use passcode (OTP). Otherwise, any OTP displayed by the authentication token 52 may be obsolete.

In connection with a challenge-response token, the user reads the challenge code from the tokencode prompt and enters it into the challenge-response token to obtain a valid tokencode. The user then returns the tokencode in response to the tokencode prompt.

In some arrangements, the user 50 simply operates the authentication token 52 to electronically send the user identifier and the tokencode to the NAS box (e.g., from an authentication token 52 having a USB port, from an authentication token 52 which is also a smart phone, etc.). In certain arrangements, the source of the tokencode prompt (i.e., the policy decision point) may provide authenticating factors back to the authentication token 52 for two-way authentication and a higher-level of security. Along these lines, the authentication token 52 does not output a current tokencode until the source (e.g., the NAS box in this example) successfully authenticates with the authentication token 52.

Upon receipt of a tokencode response containing the user identifier and the tokencode, the NAS services component in the NAS box conveys the tokencode to the tokencode authentication server embedded in the NAS box (arrow 111 in FIG. 3). The embedded tokencode authentication server performs an authentication operation (arrow 112 in FIG. 3). In particular, the embedded tokencode authentication server in the NAS box determines an expected tokencode and compares the current tokencode to the expected tokencode to determine whether the user 50 is legitimate (i.e., whether the user 50 possesses the authentication token 52). To calculate the expected tokencode, the NAS box retrieves a token seed from a database entry associated with the user identifier (also see the authentication database 74 in FIG. 2), and derives the expected tokencode from that seed.

If the current tokencode does not match the expected tokencode (i.e., the user 50 did not successfully authenticate), a negative authentication result from the NAS box does not permit the user to access the protected file (arrow 114 in FIG. 3). However, if the tokencodes do match (i.e., the user 50 successfully authenticated), a positive authentication result operates as an access control signal granting the user 50 with access to the protected on the NAS box (arrow 114).

Upon successful authentication, the NAS services component of the NAS box notifies the user 50 that access has been granted and permits the user 50 to access the protected file (arrow 116 in FIG. 3). As a result, the user 50 is now able to access the file (double arrow 118 in FIG. 3).

Based on the above-provided Example 1, it should be understood that the processing capabilities of the NAS box (also see the controller 62 in FIG. 2) are leveraged to provide tokencode authentication capabilities. As result, there is no need for a dedicated authentication server device (or for the enterprise-level infrastructure associated with a conventional tokencode authentication approach by a large company). Nevertheless, the user 50 is able to enjoy a higher level of security vis-à-vis a conventional home setting approach which simply uses passwords.

Example 2

Note that the policy decision point and the policy enforcement point do not need to be co-located, i.e., the authentication service does not have to be part of the resource being protected. Along these lines, suppose that the NAS box of FIG. 1 includes an embedded tokencode authentication server, and that the embedded tokencode authentication server is configured to control access to the web server of FIG. 1 which resides in a separate location of the private network 40.

Further suppose that a user 50 operating the tablet wishes to access a protected web page provided by the web server (e.g., family photos, work-related web pages, etc.). Again, in this Example 2, the user 50 must possess an authentication token 52 (FIG. 2) to obtain proper tokencodes for successful authentication.

In order to obtain access to the protected web page (i.e., the protected resource in this example), the user 50 sends a remote access request to the web server (arrow 132 in FIG. 4). As in Example 1, the remote access request may be in the simple form of a command to read a particular web page. Alternatively, the remote access request may be in a more elaborate form of a login request.

The web server detects the request (arrow 134 in FIG. 4) and sends a tokencode prompt which requests a user identifier and a current tokencode from the user 50 (arrow 136 in FIG. 4). As in Example 1, the tokencode prompt may be presented to the user 50 in the form of fillable cells or fields in the particular application (e.g., a GUI) that user 50 is using in an attempt to access the protected file. Alternatively, the tokencode prompt may be in the form of a webpage.

Next, the user 50 obtains a tokencode from the authentication token 52 in the user's possession (arrow 138 in FIG. 4), and sends the tokencode from the user device to the web server (arrow 140 in FIG. 4). In some arrangements, the user manually reads the tokencode from a display of the authentication token 52, types a user identifier and the tokencode into the user device, and hits a submit button to send the user identifier and the tokencode to the web server. In other arrangements, the user simply operates the authentication token 52 to electronically send the user identifier and the tokencode to the web server (e.g., from an authentication token 52 having a USB port, from an authentication token 52 which is also a smart phone, etc.).

Upon receipt of a tokencode response containing the user identifier and the tokencode, the web server sends the tokencode to the tokencode authentication server in the NAS box (arrow 141 in FIG. 4, and the tokencode authentication server performs an authentication operation (arrow 142 in FIG. 4). To determine the expected tokencode, the NAS box retrieves a seed from an authentication database entry associated with the user identifier (also see the authentication database 74 in FIG. 2), and derives the expected tokencode from that seed.

If the current tokencode does not match the expected tokencode, a negative authentication result from the NAS box is sent to the web server to prevent the user 50 from accessing the protected web page (arrow 144 in FIG. 4). However, if the tokencodes do match, a positive authentication result operates as an access control signal which the tokencode authentication server of the NAS box sends to the web server (i.e., the policy enforcement point) directing the web server to grant the user 50 with access to the protected web page on the web server (arrow 144).

Upon receipt of the access control signal indicating successful authentication from the NAS box, the web server notifies the user 50 that access has been granted and permits the user 50 to access the web page (arrow 146 in FIG. 4). As a result, the user 50 is now able to access the web page on the web server (double arrow 148 in FIG. 4).

It should be understood that the embedded tokencode authentication server in the NAS box may control access to other policy enforcement points as well, i.e., access control to multiple resources distributed within the private network 40. For example, the tokencode authentication server may control access to other protected resources which are very different from one another such as a game console, home appliances, and so on.

In some arrangements, each policy enforcement point is provisioned with an agent which takes direction from the policy decision point. These arrangements alleviate the need for further password authentication, etc. locally at the policy enforcement points. Rather, the policy enforcement points trust the policy decision point and grant access once the policy decision point provides such instruction.

In some arrangements, authentication involves use of a challenge-response token as the authentication token 52. In these arrangements, the tokencode prompt includes a challenge code provided by the authentication service (see dashed arrows 105 in FIG. 3).

Example 3

Note that the above-described techniques are capable of authorizing users on the public network 42 (FIG. 1) to access protected resources on the private network 40. Along these lines, suppose that the firewall of FIG. 1 includes an embedded tokencode authentication server, and that the embedded tokencode authentication server is configured to control access to the security camera of FIG. 1.

Further suppose that a user 50 operating the remote PC wishes to access a video feed from the security camera (e.g., to check that the house is okay, to check whether a package has been delivered to the front door, etc.). Again, in this Example 3, the user 50 possesses an authentication token 52 (FIG. 2) to obtain proper tokencodes for successful authentication.

In this situation, the firewall is a policy decision point. Additionally, the security camera is a policy enforcement point. In arrangements where the firewall blocks all user access attempts without authentication, the firewall may be treated as a policy enforcement point as well.

In order to obtain access to images from the security camera (i.e., the protected resource in this example), the user 50 provides a remote access request to the security camera (arrow 162 in FIG. 5). The security camera detects the request (arrow 164 in FIG. 5) and returns a tokencode prompt which requests a user identifier and a current tokencode from the user 50 (arrow 166 in FIG. 5).

It should be understood that the tokencode prompt may be presented to the user 50 in the form of cells or fields in the particular application (e.g., a GUI) that the user 50 is using in an attempt to access the video feed. Alternatively, the tokencode prompt may be in the form of a webpage, or the like.

Next, the user 50 obtains a tokencode from the authentication token 52 in the user's possession (arrow 168 in FIG. 5), and sends the tokencode from the user device to the security camera (arrow 170 in FIG. 5). In some arrangements, the user 50 manually reads the tokencode from a display of the authentication token 52, types a user identifier and the tokencode into the user device, and hits a submit button to send the user identifier and the tokencode to the security camera. In other arrangements, the user 50 simply operates the authentication token 52 to electronically send the user identifier and the tokencode to the security camera (e.g., from an authentication token 52 having a USB port, from an authentication token 52 which is also a smart phone, etc.).

Upon receipt of a tokencode response containing the user identifier and the tokencode, the security camera sends the tokencode to the embedded tokencode authentication server in the firewall to determine whether the tokencode is correct (arrow 171 in FIG. 5). Then, the tokencode authentication server in the firewall performs an authentication operation (arrow 172 in FIG. 5). In particular, the tokencode authentication server in the firewall determines an expected tokencode and compares the current tokencode to the expected tokencode to determine whether the user 50 is legitimate (i.e., whether the user 50 possesses the authentication token 52). To determine the expected tokencode, the firewall retrieves a seed from an entry associated with the user identifier (also see the authentication database 74 in FIG. 2), and derives the expected tokencode from that seed.

If the current tokencode does not match the expected tokencode, a negative authentication result from the firewall causes the firewall to signal the security camera to not permit the user 50 to access the video feed from the security camera (arrow 174 in FIG. 5). However, if the current tokencode and the expected tokencode do match, a positive authentication result operates as an access control signal which the firewall sends to the security camera directing the security camera to grant the user 50 with access to the video feed of the security camera (arrow 174).

Upon receipt of the access control signal from the firewall, the security camera notifies the user 50 that access has been granted and permits the user 50 to access the output (arrow 176 in FIG. 5). As a result, the user 50 is now able to access the security camera output (arrow 178 in FIG. 5), e.g., the security camera passes images back to the remote PC.

As mentioned earlier in connection with Example 2, it should be understood that the firewall may control access to other policy enforcement points as well, i.e., access control to multiple access points of the SOHO environment 20. For example, the firewall may control access to other protected resources either on the private network 40 or on the public network 42.

In some arrangements, the firewall operates as an effective policy decision point for protected resource access in both directions, i.e., from the private network 40 to the public network 42, and from the public network 42 to the private network 40.

Based on the above-provided Example 3, it should be understood that the processing capabilities of the firewall (also see the controller 62 in FIG. 2) are leveraged to provide tokencode authentication capabilities. Accordingly, there is no need for a dedicated authentication server device (or for the enterprise-level infrastructure associated with a conventional tokencode authentication approach by a large company). Nevertheless, the user 50 is able to enjoy a higher level of security vis-à-vis a conventional home setting approach which simply uses passwords.

Again, in some arrangements, authentication involves use of a challenge-response token as the authentication token 52. In these arrangements, the tokencode prompt includes a challenge code provided by the authentication service (see dashed arrows 105 in FIG. 3).

In some arrangements, the firewall is capable of performing deep packet inspection. In particular, the firewall monitors all HTTP traffic flowing through the firewall to some HTTP site inside the private network. One example is a connection from outside the firewall to a web server inside the firewall. Another example is a connection from outside the firewall to a web-based administration port on a device such as a NAS box or a router. In connection with the above-provided security camera example, the firewall inspects packets flowing through the firewall looking for some authentication such as a password prompt from the security camera instead of a tokencode prompt (see arrow 166 in FIG. 5). Upon detection of the password prompt, the firewall intercepts the password prompt, and substitutes a tokencode prompt to the remote user for a proper user identifier and tokencode (arrow 166 in FIG. 5). When firewall receives the response to the tokencode prompt, the firewall intercepts that message and then sends the user identifier and tokencode to the authentication services embedded in the SOHO environment (e.g., in the firewall, in a wireless access point, in a NAS box, etc.). If authentication is successful, then the firewall inserts an authentication response which is acceptable to the security camera which was originally asking for the user authentication. This response may be a static password to access the security camera, or some other pre-arranged response which will be acceptable to the security camera. The advantage of these arrangements is that the firewall is essentially injecting a tokencode authentication into the session, even if the security camera has no knowledge of tokencodes or the authentication service. Such operation improves the security of all devices in the SOHO environment with no specialized changes to these devices to support tokencode prompting and authentication.

Further Details

It should be understood that the authentication service can run in any of the SOHO devices 22, although some SOHO devices 22 make more sense than others. For example, since the router, firewall, NAS box, and wireless access point typically are left on constantly, an authentication service resident in one of these devices 22 would always be available. In contrast, if the authentication service was deployed in the printer, then the authentication service would not be available if the printer was turned off.

Note the authentication service was described above as providing a simple yes/no access to protected resources by way of example only. In other arrangements, the authentication service provides finer grained access control. For example, a first user 50 can be marked as an Administrator in the authentication service, but a second user 50 can be marked as a non-Administrator level user. If the second user 50 attempts to connect to the management console of the firewall, the authentication service can reject the OTP code, even if it is valid, because the second user 50 does not have the correct permissions to access the firewall management console.

It should be that this authorization function is capable of operating in a number of ways. For example, the user may initially communicate with the device 22 housing the desired protected resource, i.e., the policy enforcement point. Here, the device 22 acts as an intermediate point which passes data between the user device (e.g., a tablet, a smart phone, a notebook, etc.) and the tokencode authentication server.

In some arrangements, the authorization data is kept in the tokencode authentication server, in which case the device 22 requesting validation of the user 50 and OTP code need to also pass the requested level of access so that the tokencode authentication server can decide to allow or disallow the access.

In other arrangements, the tokencode authentication server returns the list of permissions associated with the user 50 upon a successful OTP validation, and the requesting device 22 then makes a decision if the user 50 is allowed access based on the returned list of permissions. In some cases, the device 22 requesting validation maintains its own database of allowed users and their rights, and simply uses the tokencode authentication server to validate that the correct user was attempting to access the device 22. In this case, the authorization would be done by each device 22 separately from the tokencode authentication server.

Figure 6:
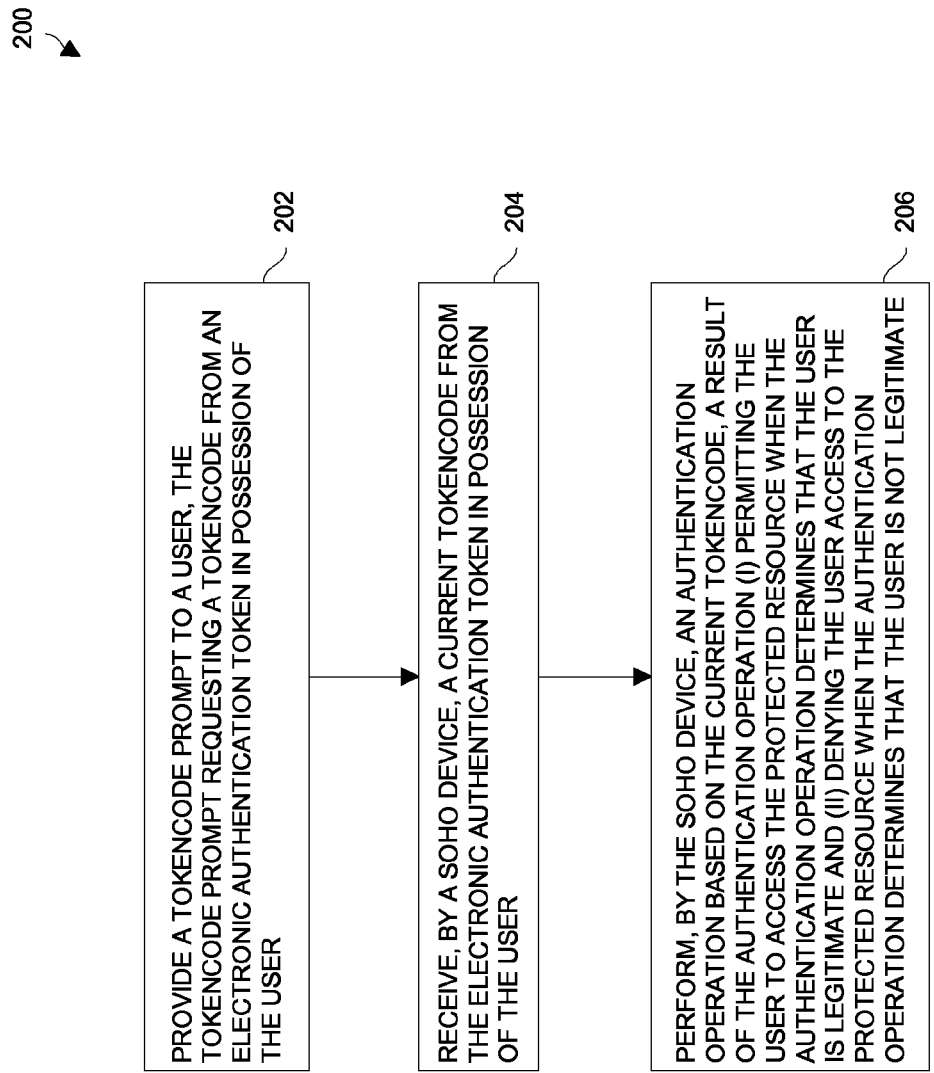
FIG. 6 is a flowchart of a procedure which is performed by the access point of FIG. 2.

FIG. 6 is a flowchart of a procedure 200 which is performed using SOHO equipment which is configured with tokencode authentication capabilities to control access to a protected resource. With such authentication capabilities, a SOHO device 22 (e.g., a NAS box, a firewall, a game console, a personal computer, etc.) is capable of operating as an effective policy decision point within the SOHO environment 20 to control one or more policy enforcement points.

At 202, a SOHO device 22 provides a tokencode prompt to a user 50. The tokencode prompt requests a tokencode from an electronic authentication token 28 in possession of the user 50 (also see arrows 106, 136, 166 in FIGS. 3-5).

At 204, the same or another SOHO device 22 receives a current tokencode from the electronic authentication token 52 in possession of the user 50. This SOHO device 22 includes an embedded tokencode authentication server. The user 50 may need to press one or more buttons on the authentication token 52 in order to obtain a current tokencode. In some arrangements, the user 50 has a challenge-response token requiring the user to key in a challenge code in order to obtain a response code as the tokencode. In some arrangements, the tokencode is a one-time use passcode (OTP) derived from a seed contained within the authentication token 52. Accordingly, after a short period of time if not used right away (e.g., one minute, three minutes, etc.), the tokencode becomes invalid.

At 206, the SOHO device 22 having the embedded tokencode authentication server performs an authentication operation based on the current tokencode. A result of the authentication operation (i) permits the user 50 to access the protected resource when the authentication operation determines that the user 50 is legitimate and (ii) denies the user 50 access to the protected resource when the authentication operation determines that the user 50 is not legitimate.

As described above, an improved technique is directed to controlling access to computerized resources using a tokencode authentication server embedded within a SOHO device 22, i.e., a device that is an access point-authentication server combination. Such a SOHO device 22 is able to control access to internal resources as well as access to other resources that the device 22 can communicate with. In one example, a networked device which is specialized to operate as network attached storage (NAS) also operates as a tokencode authentication server. In another example, a networked device which is specialized to operate as a firewall also operates as a tokencode authentication server. Such techniques eliminate the need for dedicated authentication server devices and are well suited for SOHO environments.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the above-described tokencode authentication may either operate as a security front end to the protected resources. In these situations, the user 50 may need to locally authenticate (e.g., with a password) once the user 50 has successfully authenticated using a tokencode. Alternatively, the user 50 may now have security over certain protected resources were no security exists previously.

However, in other arrangements, the user 50 may turn off local authentication in lieu of the tokencode authentication now available. In some arrangements, an agent is installed on the protected resource devices enabling them to operate effectively as policy enforcement points under direction of the policy decision point (e.g., responsive to access control signals from the policy decision point).

Additionally, it should be understood that the various types of SOHO devices 22 described above were by way of example only. Other SOHO devices 22 are capable of operating as tokencode authentication servers as well. In particular, in connection with data communications style access point, the SOHO device 22 may be a network hub, a network switch, a modem, a wireless router, and so on. Alternatively, the SOHO device 22 may be a home computer, SOHO-style data storage assembly, a game console, a controller of a home security system, and so on. For any of these devices, the control circuitry of the processors is powerful enough to perform robust and reliable tokencode authentication. Moreover, in some situations such as a firewall setting, the control circuitry is capable of performing deep packet inspection to detect authentication requests (e.g., for instance an SSL handshake), and redirect requests to the authentication server within the SOHO device 22, i.e., an OTP-validating service running within the SOHO device 22.

Furthermore, in some arrangements, if the user is in the SOHO environment 20 (e.g., the user is at home) communicating wirelessly between a laptop and the NAS box (or other device on the private network 40), the wireless access point can monitor or inspecting communications. When the NAS box prompts for password authentication by outputting a password prompt to the user, the wireless access point can intercept the password prompt and prompt the user for a tokencode instead. Examples of communications that the wireless access point is capable of inspecting include web-based communications, telnet, ftp, and so on.

One should appreciate that, especially in small office or home office applications, managing access control to computerize resources remains problematic. However, with the above-described improved techniques, a policy decision point that supports authentication tokens is combined with a network access point. Such a combination is capable of supporting advanced operational cases such as roaming.

One should further appreciate that the above-described techniques are may easily integrate into an existing SOHO environment as more and more devices become networked. Furthermore, even though communication capabilities have greatly expanded the value of information assets in large enterprises, such technology is only now trickling down to smaller installations. That is, even though large enterprises have become sophisticated in the way they control access to their information assets, the small business and consumer markets have lagged behind.

In fact, most of these markets are still relying on passwords. And, it is well-known that passwords are problematic. Users tend to pick bad ones and promptly forget them. Large enterprises manage this problem using authentication tokens. Even though tokens have a larger provisioning cost, over time they save money and time. Large enterprises with their professional IT staffs are easily able to handle this administrative burden.

In contrast, average consumers are unwilling to set up and manage a server for the express purpose of validating tokencodes. Existing products in the marketplace all share this shortcoming.

The gap between conventional enterprise security and conventional SOHO security is only becoming more pronounced. At first, consumer and small office installations were primarily concerned with accessing computerize resources hosted elsewhere. The classic example of this is a user accessing a website using a web browser. But now even these small installations are beginning to host their own assets online. For example, consumers are now able to purchase network attached storage devices that permit access to data both locally and over the Internet. Unfortunately, the only access control these products currently offer is the much-maligned password.

However, with the above-described improved techniques, stronger security is easily achieved with the availability of a policy decision point. In particular, consider a user who wants to access a computerize resource hosted by some policy enforcement point. Suppose the user is provisioned with an authentication token. Suppose further that the user has a PC, tablet, smart phone, game console, or other device. In current practice, this device relies on a local network access point for the purpose of exchanging data both locally and over the Internet.

In connection with the improved techniques, the policy decision point is integrated with the network access point. For its part, the access point provides some means of accepting a tokencode from the user over the network. For example, the access point can achieve this goal by implementing a small Web server who hosts a webpage into which the user can type the code displayed by the token. Once the code has been accepted, the integrated policy decision point checks if the code is correct. It informs the policy enforcement point of its decision. In response, the policy enforcement point allows or denies access to the requested resource.

Compared to the state-of-the-art, the above-described improved techniques make it easier for the nonprofessional to deploy authentication tokens. By eliminating the need to stand up and manage a dedicated server, the user has one fewer computer to procure, provision, and manage. The benefits of deploying authentication tokens when compared with passwords are significant: users are less likely to forget a password and attackers are unable to perpetrate dictionary-based password guessing attacks.

With the improved techniques, additional improvements and refinements are available. Consider provisioning. Large enterprises expend some resources on provisioning authentication tokens to the user population. Essentially, one must set up a symmetric key between the token and the policy decision point. In addition, one must maintain a database of user identities and token identities. While conceptually simple, this problem is often compounded by the sheer size of the user base.

By contrast, the consumer and small business market is by definition concerned with many fewer users. In fact, we can take advantage of this fact to propose a major improvement in usability. Instead of relying on the user to transport a symmetric key, this task could be carried out at manufacturing time. Then the consumer could purchase a network access point along with a small number of authentication tokens which already share symmetric keys.

As another improved facet, consider that a network access point is merely one part of the network infrastructure. Other infrastructure components include wide area network adapters such as cable modem, DSL modem, cellular backhaul, or satellite data connection. Still other infrastructure components include network attached storage. Advantageously with the improved techniques, integrating a policy enforcement point that supports authentication tokens may be combined with a device that provides some or all of these other features. For example, in current practice devices are sold that integrate a cable modem and wireless network access point. It will be understood that the improved techniques may be practiced in conjunction with a device that offers some or all of these network infrastructure services.

In connection with roaming, increasingly, consumer and small-business users are hosting their own resources for access over the Internet. For example, network attached storage devices sold to consumers enable access over the Internet. So files stored on a home network attached drive may be accessed by the consumer even when they are away from home. In this case, the improved techniques can provide policy decisions even if the user is remote.

Suppose that a policy enforcement point is integrated into the network access point. Remote requests to access the files will ultimately be intermediated by the network access point. Before allowing access to files, the improved techniques can prompt the user for a tokencode and validate its correctness. This may be accomplished perhaps by intercepting requests for resources hosted by the drive.

Before providing further discussion of particular implementations, it is worthwhile to establish some details about how this functionality is implemented in the current state-of-the-art.

Internet service providers have long known that the Internet protocol suffers from some notable deficiencies including a relatively small number of total devices supported. To make up for this deficiency in current practice, Internet service providers routinely will provide a subscriber with a single dynamic IP address. In principle, every time a subscriber's cable modem is restarted it could be assigned a different IP address. Therefore when the consumer is roaming, it is unclear which address should be used to access the cable modem and therefore to access the storage device.

To remedy the situation, services such as dynamic DNS have emerged. Consumers get a name that is easy to remember such as "JohnSmith.myStorage.com." Each time the cable modem restarts its address is registered with the "myStorage.com" dynamic DNS service provider. This way, when the consumer is away from home they merely need to remember the device name. Behind the scenes, the modem's current IP address will be provided to the Internet's DNS servers so that the name will resolve correctly.

Now that the current state-of-the-art in this area is established, it is worth noting that the policy decision point may masquerade as the resource provider. For example, in current practice the storage device is responsive to network packets addressed to the consumer friendly device name. In improved techniques, the policy decision point can keep track of user sessions. As one improvement, the policy decision point can intercept attempts to create a new session with the resource provider. Instead of simply allowing access, the policy decision point can redirect requests to its own webpage that accepts token codes. Only if the correct tokencode is received does the policy decision point allow further access to the resource.

As a further improvement, consider that consumers may demand higher security in their communications, such as using the SSL protocol. Here, the integrated policy decision point could additionally provide an SSL tunneling mechanism. In this case, the policy decision point may also authenticate itself to the user's PC or token. This additional authentication may be accomplished by means of public key cryptography with digital certificates or perhaps another tokencode that is received from the policy decision point to be validated by the token.

As an additional improvement, consider that this mutual authentication need not be tied to the SSL protocol or even to the roaming use case. In fact, this approach could be taken even while the consumer is at home.

As for the token itself in today's state-of-the-art these tend to be distinct hardware tokens. It will be readily apparent that the token can be embodied in software running on a smart phone or a small USB device or a smart card.

Furthermore, in connection with token provisioning within a home network, one will appreciate that a router itself may be able to provision a device (i.e., a hardware token, a soft token on a smart phone, etc.) with a token seed and software as needed. That is, the router may be put in contact with a device and transfer a token seed to the device. This would enable the device to automatically authenticate at later times with the router. Such operation may require little or no user interaction.

The device could be known as "trusted" in order to allow the provisioning in a number of ways. For example, proximity can be used for trust, pushing buttons on the router/device could indicate trust for provisioning. Other simplified means could be used to denote a trusted status to allow/enable provisioning (two tiered provisioning such as communicating to the device on dual wireless bands, wireless and Bluetooth). Moreover, the device would not be limited to heavily provisioned computerized devices but may also include smart door locks, garage doors, stoves, home security systems, and so on.

Additionally, given a trusted provisioning on the "home network," the device can then be used to gain secure access outside of the secure network using the provisioned token. Furthermore, protected resources may include a garage door opener, an electronic front door, a home security system, refrigerators, etc. Such modifications and enhancements are intended to belong to various embodiments of the disclosure.

What is claimed is:

1. A method of controlling access to a protected resource, the method comprising:
  providing, by a SOHO (small office/home office) device connected to a private network and to a public network, a tokencode prompt to a user device roaming on the public network, the tokencode prompt requesting a tokencode from an electronic token possessed by a user of the user device, the SOHO device including a database containing a set of token seeds from which expected one-time use passcodes (OTPs) are derived;
  receiving, by the SOHO device from the user device, a current tokencode from the electronic token possessed by the user; and
  performing, by the SOHO device, an authentication operation based on the current tokencode, a result of the authentication operation (i) permitting the user to access the protected resource when the authentication operation determines that the user is legitimate and (ii) denying the user access to the protected resource when the authentication operation determines that the user is not legitimate;
  wherein the SOHO device is a network firewall unit having (i) network ports and (ii) a controller which performs network firewall operations to control network traffic between the network ports; and
  wherein performing the authentication operation includes:
    running, by the controller of the network firewall unit, a tokencode authentication server; and
    locally comparing, by the tokencode authentication server run by the controller of the network firewall unit, the current tokencode to an expected tokencode to determine whether the user is legitimate,
  and wherein the method further comprises:
    providing, by the SOHO device, a token seed from the database to the electronic token possessed by the user to configure the electronic token to provide, as tokencodes, current OTPs for comparison with the expected OTPs during authentication; and providing the user device roaming on the public network with control of a home appliance on the private network when the user is legitimate.

2. A method as in claim 1 wherein the SOHO device is in communication with a network attached storage (NAS) unit having (i) a set of storage drives and (ii) a controller which performs data storage operations to store data into and load data from the set of storage drives, the data being the protected resource; and wherein performing the authentication operation includes:

providing a security control signal to the NAS unit to operate the NAS unit as a policy enforcement point.

3. A method as in claim 2, further comprising:

storing personal data of the user on the set of storage drives of the NAS unit, the controller of the NAS unit working to secure the personal data by performance of tokencode authentication operations.

4. A method as in claim 1, further comprising:

providing the user device roaming on the public network with access to an access point device on the private network when a second tokencode from the user device matches a second expected tokencode, wherein the access point device on the private network includes a data storage apparatus; and wherein providing the user device with access to the access point device includes:

conveying communications signals between user device and the data storage apparatus to enable the user device to access data on the data storage apparatus.

5. A method as in claim 4 wherein providing the user device with access to the access point device further includes:

in response to performance of an initialization operation, registering a current network address of the network firewall unit with a dynamic domain name system (DDNS) service to enable the user device to communicate with the network firewall unit using a device name which the DDNS service resolves into the current network address.

6. A method as in claim 1 wherein the method further comprises:

providing the user device with access to an access point device on the public network when a second tokencode matches a second expected tokencode, and preventing the user device from accessing the access point device on the public network when the second tokencode does not match the second expected tokencode.

7. A method as in claim 1, further comprising:

sending a communication to the electronic token possessed by the user to authenticate the SOHO device to the electronic token.

8. A method as in claim 1, further comprising:

managing the set of token seeds within the database to manage access to multiple access point devices using OTP authentication from the SOHO device.

9. A method as in claim 1 wherein providing the tokencode prompt to the user includes:

supplying the user with a challenge code which is a random number generated by the SOHO device, the user entering the challenge code into the electronic token to derive the current tokencode.

10. The method of claim 1, wherein the protected resource is disposed on a device, separate from the network firewall unit, and connected to the network firewall unit over the private network.

11. A small office/home office (SOHO) apparatus, comprising:

a network interface connected to a private network and to a public network;

memory, the memory storing a database containing a set of token seeds from which expected one-time use passcodes (OTPs) are derived; and control circuitry coupled to the network interface and the memory, the memory storing instructions which, when carried out by the control circuitry, cause the control circuitry to:

provide, through the network interface, a tokencode prompt to a user device roaming on the network, the tokencode prompt requesting a tokencode from an electronic token possessed by a user, receive a current tokencode from the electronic token possessed by the user through the network interface, and perform an authentication operation based on the current tokencode, a result of the authentication operation (i) permitting the user to access the protected resource when the authentication operation determines that the user is legitimate and (ii) denying the user access to the protected resource when the authentication operation determines that the user is not legitimate;

wherein the network interface includes network ports;

wherein the control circuitry is constructed and arranged to perform network firewall operations to control network traffic between the network ports; and wherein the control circuitry, when performing the authentication operation, is constructed and arranged to:

run a tokencode authentication server; and locally compare, by the tokencode authentication server, the current tokencode to an expected tokencode to determine whether the user is legitimate, and wherein the control circuitry is further constructed and arranged to:

provide, by the SOHO device, a token seed from the database to the electronic token possessed by the user to configure the electronic token to provide, as tokencodes, current OTPs for comparison with the expected OTPs during authentication; and provide the user device roaming on the public computer network with control of a home appliance on the private network when the user is legitimate.

12. A SOHO apparatus as in claim 11 wherein the network interface is constructed and arranged to communicate with a network attached storage unit which includes a set of storage drives; wherein the control circuitry is constructed and arranged to perform data storage operations to store data into and load data from the set of storage drives.

13. A SOHO apparatus as in claim 11 wherein the instructions further cause the control circuitry to:

send a communication through the network interface to the electronic token possessed by the user to authenticate the SOHO device to the electronic token.

14. A computer program product having a non-transitory computer readable medium which stores a set of instructions to control access to a protected resource, the set of instructions, when carried out by computerized circuitry of a set of small office/home office (SOHO) devices on a private network, causing the computerized circuitry of the set of SOHO devices to perform a method of:

providing, via communication over the private network and over a public network, a tokencode prompt to a user device roaming on the public network, the tokencode prompt requesting a tokencode from an electronic token possessed by a user, the SOHO device including a database containing a set of token seeds from which expected one-time use passcodes (OTPs) are derived;

receiving, from the user device, a current tokencode from the electronic token possessed by the user; and performing an authentication operation based on the current tokencode, a result of the authentication operation (i) permitting the user to access the protected resource when the authentication operation determines that the user is legitimate and (ii) denying the user access to the protected resource when the authentication operation determines that the user is not legitimate;

wherein the set of SOHO devices includes a network firewall unit having (i) network ports and (ii) a controller which performs network firewall operations to control network traffic between the network ports; and wherein performing the authentication operation includes:

running, by the controller of the network firewall unit, a tokencode authentication server; and locally comparing, by the tokencode authentication server run by the controller of the network firewall unit, the current tokencode to an expected tokencode to determine whether the user is legitimate, and wherein the method further comprises:

providing, by the SOHO device, a token seed from the database to the electronic token possessed by the user to configure the electronic token to provide, as tokencodes, current OTPs for comparison with the expected OTPs during authentication; and providing the user device roaming on the public network with control of a home appliance on the private network when the user is legitimate.

15. The method of claim 10, wherein the tokencode authentication server run by the controller of the network firewall unit provides tokencode authentication for multiple protected resources disposed on multiple devices connected to the network firewall unit over the private network.

\* \* \* \* \*